(12) United States Patent
Cho et al.

(10) Patent No.: US 7,771,889 B2
(45) Date of Patent: Aug. 10, 2010

(54) FUEL CARTRIDGE AND DIRECT LIQUID FEED FUEL CELL SYSTEM HAVING THE SAME

(75) Inventors: Hye-Jung Cho, Anyang-si (KR); Jae-yong Lee, Seongnam-si (KR); Hyuk Chang, Seongnam-si (KR); Kyoung Hwan Choi, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 726 days.

(21) Appl. No.: 11/444,468

(22) Filed: Jun. 1, 2006

(65) Prior Publication Data

US 2007/0015030 A1    Jan. 18, 2007

(30) Foreign Application Priority Data

Jul. 16, 2005    (KR) ...................... 10-2005-0064556

(51) Int. Cl.
*H01M 8/08* (2006.01)
*H01M 8/04* (2006.01)

(52) U.S. Cl. .................. 429/513; 429/514; 429/515; 429/479

(58) Field of Classification Search .......... 429/12, 429/22–23, 27, 34–35, 38–39; 206/0.6–0.7; 723/694, 720, 722–723; 345/211–212; 411/21–22, 411/26–28, 32–33, 34–36, 38, 54–55, 60.1, 411/62, 64–65, 68, 71–74, 80–80.2; 215/222–223, 215/235, 244, 245, 270, 272, 274–275, 277, 215/280, 282–284, 287, 290

See application file for complete search history.

(56) References Cited

U.S. PATENT DOCUMENTS

| | | | | |
|---|---|---|---|---|
| 2004/0005488 A1 | * | 1/2004 | Faris et al. | 429/23 |
| 2004/0126643 A1 | * | 7/2004 | Kinkelaar et al. | 429/34 |
| 2005/0057555 A1 | * | 3/2005 | Nakamura et al. | 345/211 |
| 2005/0106441 A1 | * | 5/2005 | Yamamoto et al. | 429/34 |
| 2005/0170230 A1 | * | 8/2005 | Nakamura et al. | 429/34 |
| 2005/0230341 A1 | * | 10/2005 | Dong | 215/228 |
| 2006/0127733 A1 | * | 6/2006 | Kaschmitter et al. | 429/34 |
| 2007/0026279 A1 | | 2/2007 | Hirsch et al. | |

FOREIGN PATENT DOCUMENTS

| | | |
|---|---|---|
| JP | 2004-055307 | 2/2004 |
| JP | 2005-116210 | 4/2005 |
| JP | 2005-166551 | 6/2005 |

* cited by examiner

*Primary Examiner*—Dah-Wei D Yuan
*Assistant Examiner*—Claire L Rademaker
(74) *Attorney, Agent, or Firm*—Stein McEwen, LLP

(57) ABSTRACT

A liquid fuel cartridge and a direct liquid feed fuel cell system having the liquid fuel cartridge. The direct liquid feed fuel cell system includes: a housing having a cartridge inserting groove and a longitudinal opening in the cartridge inserting groove; a fuel cell located in the housing and composed of cathode and anode electrodes and an electrolyte membrane; a liquid fuel cartridge that contains a liquid fuel, inserted into the cartridge inserting groove, to supply the liquid fuel to the anodes; and a fuel transport unit to transport the liquid fuel from the liquid fuel cartridge to the anodes, wherein the liquid fuel is supplied to the fuel transport unit when the liquid fuel cartridge is rotated in a first direction and the supply of the liquid fuel is disconnected when the liquid fuel cartridge is rotated in an opposite direction.

19 Claims, 12 Drawing Sheets

122a 122b 122d 122b 122d 122b 122a

FUEL CARTRIDGE AND DIRECT LIQUID FEED FUEL CELL SYSTEM HAVING THE SAME

CROSS-REFERENCE TO RELATED APPLICATIONS

This application claims the benefit of Korean Patent Application No. 2005-64556, filed Jul. 16, 2005, in the Korean Intellectual Property Office, the disclosure of which is incorporated herein by reference.

BACKGROUND OF THE INVENTION

1. Field of the Invention

Aspects of the present invention relate to a fuel cartridge and a direct liquid feed fuel cell system having the same, and more particularly, to a fuel cartridge that controls a liquid fuel supply to a fuel cell, and a direct liquid feed fuel cell system having the fuel cartridge.

2. Description of the Related Art

A fuel cell is an electro-chemical apparatus that transforms chemical energy of a liquid fuel into electrical energy via an electro-chemical reaction. A direct liquid feed fuel cell provides electrical energy from a liquid fuel, such as methanol, through a direct reaction of the liquid fuel with oxygen. The direct liquid feed fuel cell is different from a secondary cell in that the direct liquid feed fuel cell can be operated as long as the fuel is supplied from an external fuel source.

A direct liquid feed fuel cell can be used in a mobile communication device by mounting directly on the device or separately charging a rechargeable battery for the mobile communication device.

A fuel cell for supplying electricity to the mobile communication equipment requires a liquid fuel supply system having a means for controlling the supply of the liquid fuel as necessary.

SUMMARY OF THE INVENTION

Aspects of the present invention provide a liquid fuel cartridge that controls a liquid fuel supply to a fuel cell by a rotation, and a direct liquid feed fuel cell system having the liquid fuel cartridge.

According to an aspect of the present invention, there is provided a direct liquid feed fuel cell system comprising: a housing having a cartridge inserting groove and a first opening formed in a length direction of the cartridge inserting groove; a fuel cell located under an upper surface of the housing and including a plurality of cathode electrodes on an electrolyte membrane and a plurality of anode electrodes under the electrolyte membrane corresponding to the cathode electrodes; a liquid fuel cartridge that contains a liquid fuel, is inserted into the cartridge inserting groove to supply the liquid fuel to the anode electrodes; and a fuel transport unit that transports the liquid fuel of the liquid fuel cartridge to the anode electrodes by being located between the liquid fuel cartridge and the anode electrodes, wherein the liquid fuel is supplied to the fuel transport unit when the liquid fuel cartridge is rotated in a first direction and the supply of the liquid fuel is disconnected when the liquid fuel cartridge is rotated in a direction opposite to the first direction.

While not required in all aspects, the upper surface of the housing may comprise a plurality of holes for an air supply to the cathode electrodes.

While not required in all aspects, the fuel transport unit may comprise a porous transport sheet that passes through the first opening, the porous transport sheet having an end part that selectively contacts the liquid fuel cartridge according to a rotation of the liquid fuel cartridge.

While not required in all aspects, the fuel transport unit may further comprise a transport plate that supports the transport sheet from below the transport sheet.

While not required in all aspects, the transport plate may comprise a slit through which the end part of the transport sheet passes and a guide unit that supports the end part of the transport sheet that has passed through the slit by extending a lower surface of the slit.

While not required in all aspects, the transport plate may comprise a protrusion pattern on a region outside a region of the anode electrodes, and the protrusion pattern may facilitate a uniform distribution of the liquid fuel supplied to the transport sheet from the liquid fuel cartridge.

While not required in all aspects, the transport sheet may comprise a trench corresponding to the protrusion pattern.

While not required in all aspects, the fuel transport unit may comprise a spacer plate having a predetermined height which covers the region corresponding to the protrusion pattern of the transport plate, and the spacer plate may be located on the transport sheet.

While not required in all aspects, the liquid fuel cartridge may comprise a cylindrical main body that stores the liquid fuel, and the cylindrical main body may comprise a long groove in the length direction of the cartridge inserting groove.

While not required in all aspects, the liquid fuel cartridge may further comprise a transport layer that surrounds the cylindrical main body, and the transport layer has an end part that contacts the end part of the transport sheet by a rotation of the cylindrical main body.

While not required in all aspects, the liquid fuel cartridge may comprise: a cylindrical main body that stores the liquid fuel, comprising a long groove in the length direction of the cartridge inserting groove; a pocket which is a hollow cylinder into which the cylindrical main body is inserted, the pocket having a second opening formed in the length direction of the liquid fuel cartridge corresponding to an end part of the transport sheet; a cap fixed to an outside of the cylindrical main body inserted into the pocket to cover the cartridge inserting groove; and a cover plate that covers a wall of the long groove by being rotatably mounted on the pocket and is opened so that the cylindrical main body can contact the end part of the transport sheet by rotating with the rotation of the cylindrical main body.

While not required in all aspects, an elastic member may be installed at a bottom of the cartridge inserting groove to contact the pocket, an outer circumference of the pocket may comprise a protrusion part, the housing may comprise a guide groove through which the protrusion part passes, and after the liquid fuel cartridge is inserted into the cartridge inserting groove and aligned so that the protrusion part can pass along the guide groove, when the cap is released by rotating in the first direction while the elastic member is compressed by pushing the cap, the liquid fuel cartridge may locate at a first position where the liquid fuel cartridge is mounted in the cartridge inserting groove.

While not required in all aspects, the liquid fuel cartridge may comprise a cylindrical main body that stores the liquid fuel, comprising a long groove in the length direction of the cartridge inserting groove; a cap fixed to an outer end face of the cylindrical main body, the direct liquid feed fuel cell system further comprising a cover plate that covers a wall of the long groove by being rotatably mounting on the housing and is opened by rotation of the cylindrical main body so that the cylindrical main body can contact the end part of the transport sheet.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
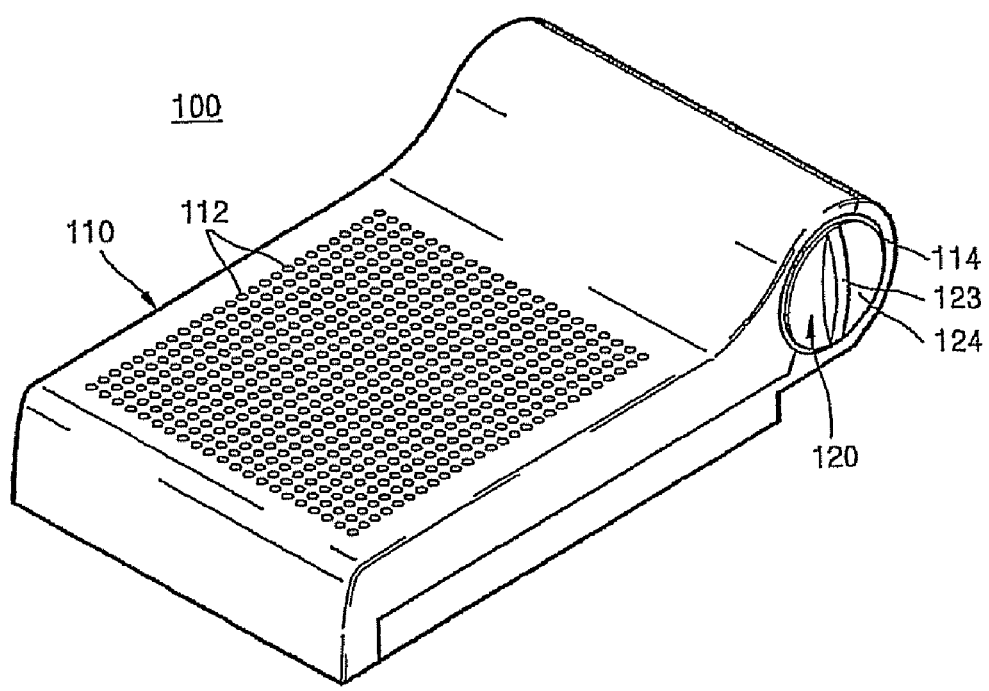
FIG. 1 is a perspective view illustrating a direct liquid feed fuel cell system having a fuel cartridge according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a perspective view illustrating a direct liquid feed fuel cell system having a fuel cartridge according to an embodiment of the present invention. A direct liquid feed fuel cell system 100 includes a housing 110 and a detachable liquid fuel cartridge 120 mounted on a side of the direct liquid feed fuel cell system 100. A cartridge inserting groove 114 is a long groove to accommodate the liquid fuel cartridge 120, formed in the housing 110, and while not required in all aspects, the cartridge inserting groove 114 can be a substantially cylindrical cavity formed of the outer surface of the housing 110.

Figure 2:
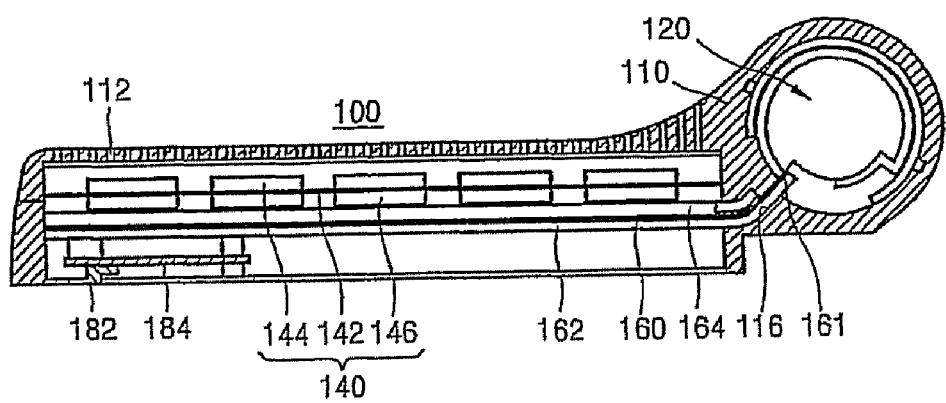
FIG. 2 is a cross-sectional view illustrating the direct liquid feed fuel cell system having the fuel cartridge shown in FIG. 1.

FIG. 2 is a cross-sectional view illustrating the direct liquid feed fuel cell system having the fuel cartridge shown in FIG. 1.

Referring to FIG. 2, the housing 110 also encloses a fuel cell 140 and a fuel transport unit between the liquid fuel cartridge 120 and the fuel cell 140. An opening 116 is formed in the housing 110 in the length direction of the cartridge inserting groove 114, and the fuel transport unit passes through the opening 116 to contact the liquid fuel cartridge 120.

The fuel cell 140 includes an electrolyte membrane 142, a plurality of cathode electrodes 144 formed on the electrolyte membrane 142, and a plurality of anode electrodes 146 formed under the electrolyte membrane 142 at a region corresponding to the cathode electrodes 144. That is, the fuel cell 140 includes a plurality of unit fuel cells. While not required in all aspects, the unit fuel cells are connected in series. Further description of the series circuit configuration of the unit fuel cells is omitted since it is well known in the art.

While not required in all aspects, a plurality of holes 112 is formed in the upper surface of the housing 110 to supply oxygen (air) to the cathode electrodes 144 through the holes 112.

Figure 3:
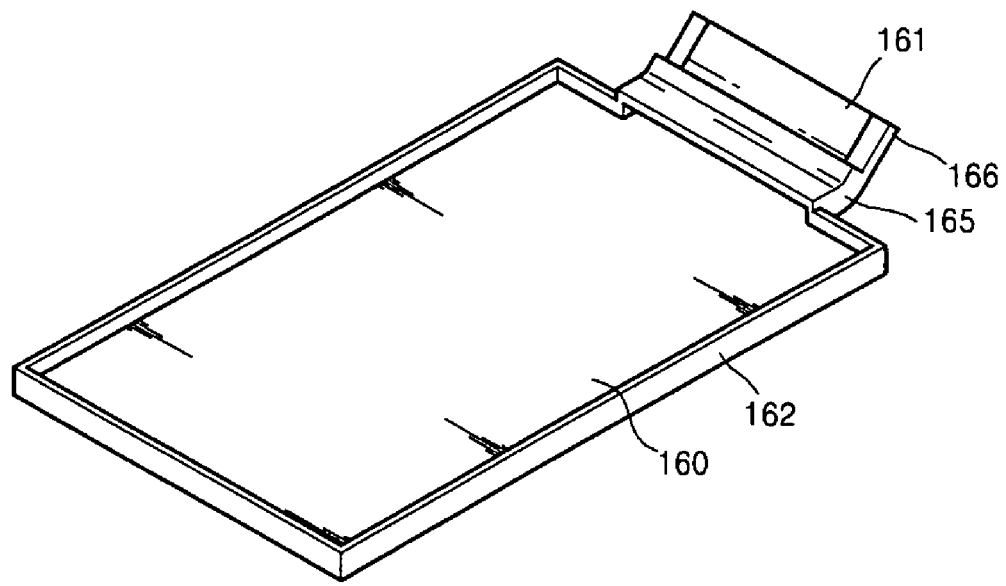
FIG. 3 is a perspective view illustrating a transport plate and a transport sheet according to an embodiment of the present invention.

The fuel transport unit includes a transport sheet 160 to transport the liquid fuel to the anode electrodes 146 of the fuel cell 140 by a capillary force, since one end of the transport sheet 160 is connected to the liquid fuel of the liquid fuel cartridge 120. While not required in all aspects, the transport sheet 160 may be coupled to an upper part of a transport plate 162 depicted in FIG. 3. An upper surface of the transport sheet 160 contacts the anode electrodes 146 of the unit fuel cell. The transport plate 162 includes a slit 165 through which an end part 161 of the transport sheet 160 passes, and a guide unit 166 that supports the end part 161 of the transport sheet 160 that passes through the slit 165, by extending the lower surface of the slit 165. A spacer plate 164 may also be located between the anode electrodes 146 and the transport sheet 160. The structure of the spacer plate 164 will be described later.

A printed circuit substrate 184 may be mounted under the fuel transport unit and electrically connected to a terminal (not shown) of the fuel cell 140 and connected through an electrical circuit to an external terminal connected to a mobile electronic device (not shown) for charging the mobile electronic device.

Figure 4:
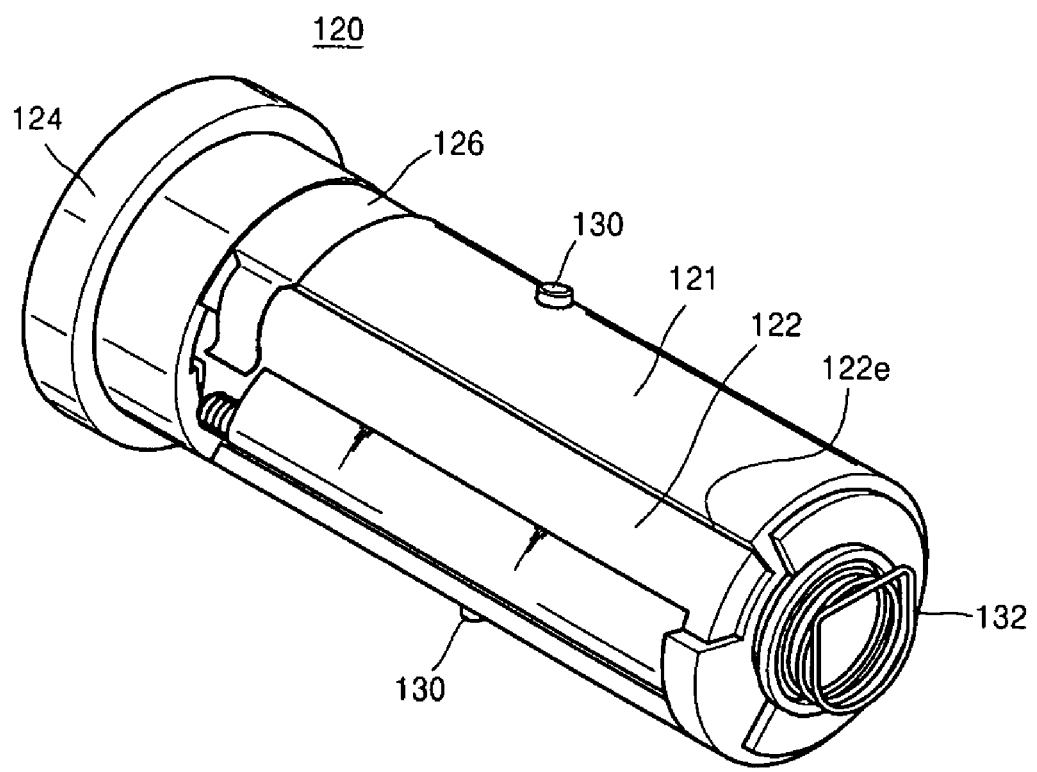
FIG. 4 is a perspective view illustrating a liquid fuel cartridge according to an embodiment of the present invention.
Figure 5:
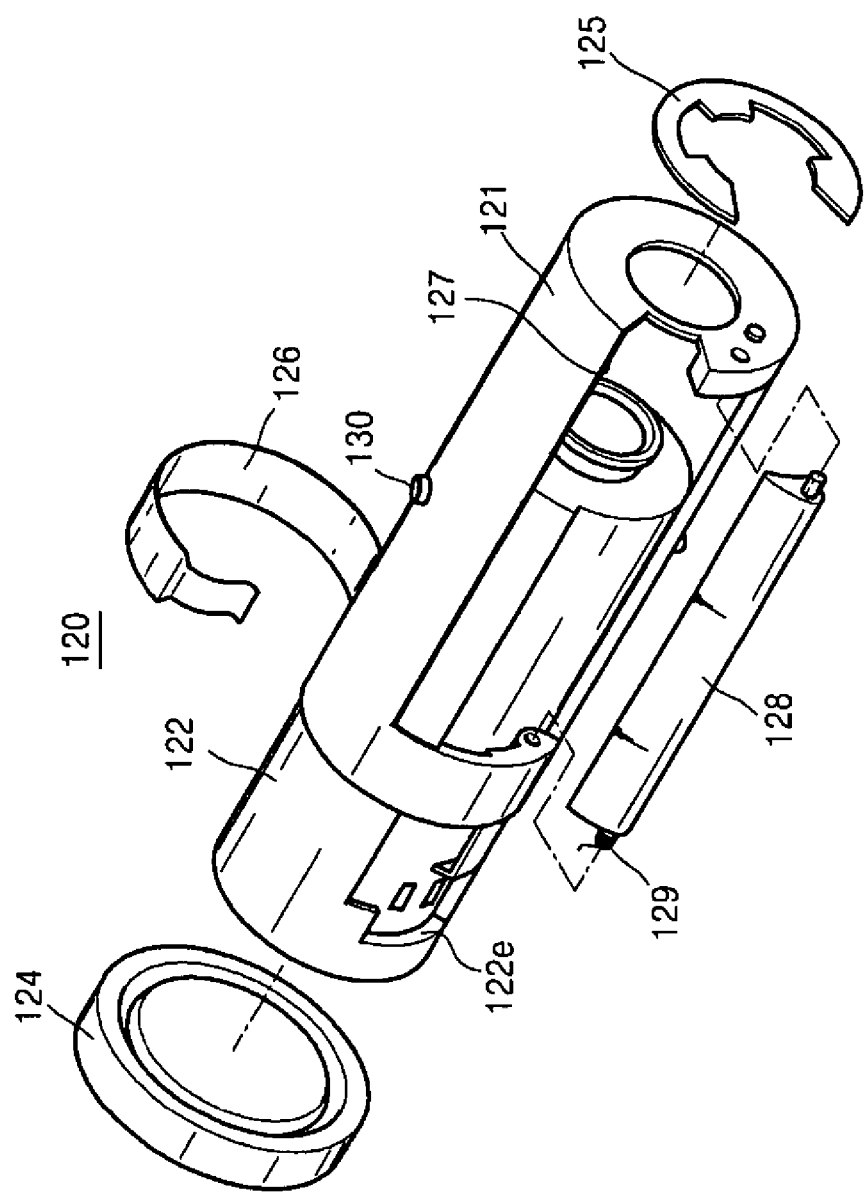
FIG. 5 is an exploded perspective view of the liquid fuel cartridge of FIG. 4.

FIG. 4 is a perspective view illustrating a liquid fuel cartridge according to an embodiment of the present invention, and FIG. 5 is an exploded perspective view of the liquid fuel cartridge of FIG. 4. The liquid fuel cartridge 120 includes an external pocket 121, a cylindrical main body 122 that stores a liquid fuel and is inserted into the external pocket 121, a cap 124 with a handle 123 (in FIG. 1) that is fixed to the cylindrical main body 122 and rotates the cylindrical main body 122 with respect to the external pocket 121, an E-ring 125 and a holder spring 126 that fix the cylindrical main body 122 to the external pocket 121, a cover plate 128 rotatably attached to the external pocket 121 to be elastically biased in a direction to cover an opening 127 of the external pocket 121, and a cover plate spring 129 that provides an elastic force to the cover plate 128. Protrusion parts 130 are formed on the outer circumference of the external pocket 121. A long groove 122e corresponding to the opening 127 is formed in the cylindrical main body 122. The long groove 122e provides a space which allows the end part 161 of the transport sheet 160 to enter the cylindrical main body 122, and the cylindrical main body 122 contacts the end part 161 of the transport sheet 160 in this space.

Figure 6A:
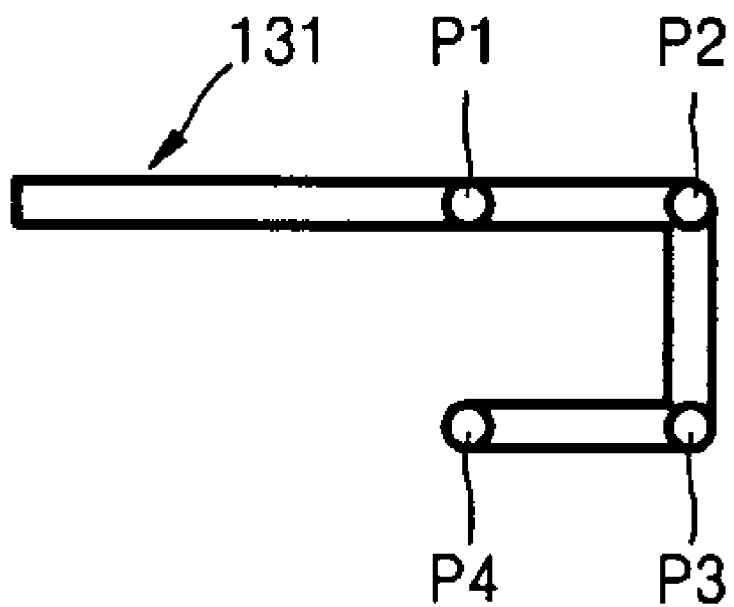
FIGS. 6A and 6B are schematic drawings of the shapes of guide grooves according to embodiments of the present invention.
Figure 6B:
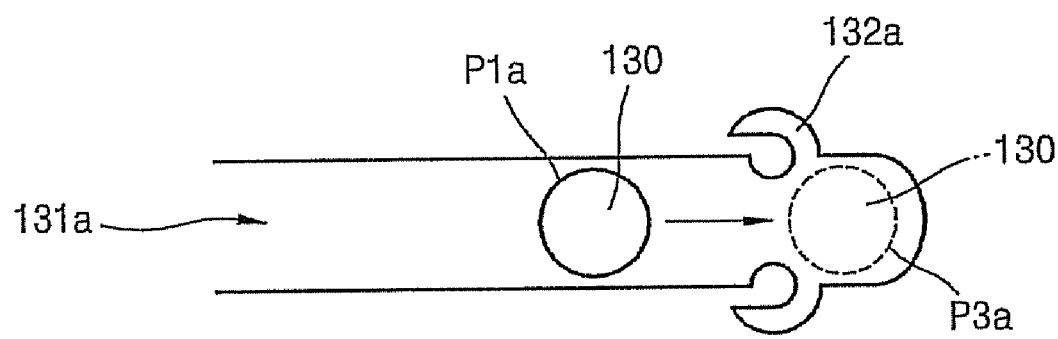
Figure 6B:
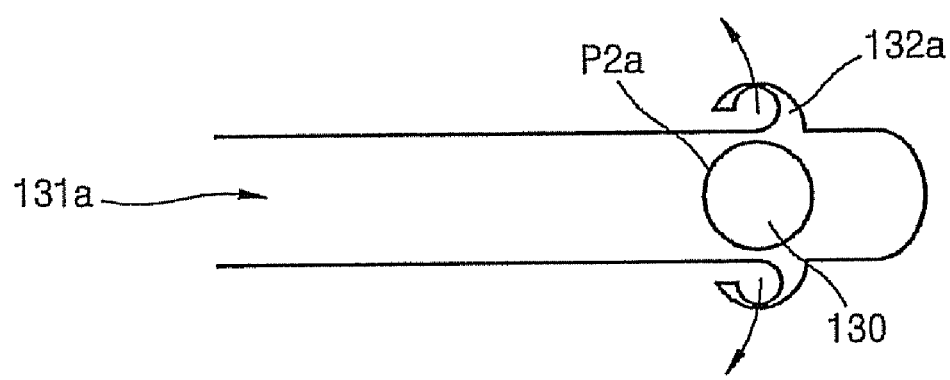

Guide grooves 131 for guiding the protrusion parts 130 when the liquid fuel cartridge 120 is inserted into the housing 110 are formed in the housing 110 wall along the inside of the cartridge inserting groove 114. FIG. 6A is a schematic drawing of the shape of the guide groove 131. Reference numeral 132 indicates a compression spring attached to the bottom of the cartridge inserting groove 114 of the housing 110. The compression spring 132 provides an elastic force to push the liquid fuel cartridge 120 outward when the liquid fuel cartridge 120 is released from the cartridge inserting groove 114. FIG. 6B is a schematic drawing of another shape of a guide groove 131a. Reference numeral 132a indicates elastic catches near the end of the guide groove 131a to allow the protrusion parts 130 to pass the elastic catches 132a by elastically deforming and then springing back into place to fix the protrusion parts 130 at the end of the guide grooves 131a.

A process for mounting the external pocket 121 of the liquid fuel cartridge 120 in the housing 110 will now be described with reference to FIG. 6A. To mount the liquid fuel cartridge 120 in the housing 110, the liquid fuel cartridge 120 is inserted into the cartridge inserting groove 114 while the protrusion parts 130 are aligned with the guide grooves 131. At this time, the liquid fuel cartridge 120 reaches a first position P1 where it is met by the elastic force of the compression spring 132. When the liquid fuel cartridge 120 is pushed downwards further, the protrusion parts 130 reach a second position P2 and the elastic force of the compression spring 132 locks the main body 122 rotation relative to the external pocket 121, and when the handle 123 of the cap 124 is turned clockwise, the protrusion parts 130 reach a third position P3. Next, when the liquid fuel cartridge 120 is released, the liquid fuel cartridge 120 is pushed upwards to a fourth position P4 and fixed by the elastic force of the compression spring 132 while releasing the main body 122 rotation relative to the external pocket 121. The process for releasing the liquid fuel cartridge 120 from the housing 110 is the reverse of the mounting process, and thus further description thereof is omitted.

Another process for mounting the external pocket 121 of the liquid fuel cartridge 120 in the housing 110 will now be described with reference to FIG. 6B. To mount the liquid fuel cartridge 120 in the housing 110, the liquid fuel cartridge 120 is inserted into the cartridge inserting groove 114 while the protrusion parts 130 are aligned with the guide grooves 131a. At this time, the liquid fuel cartridge 120 reaches a first position P1a where it is met by the elastic force of the compression spring 132. Next the liquid fuel cartridge 120 is pushed downwards further, the compression spring 132 is compressed and the protrusion parts 130 elastically press the elastic catches 132a away from the protrusion parts 130 and the liquid fuel cartridge reaches a second position P2a. Finally, the protrusion parts 130 pass the elastic catches 132a and the liquid fuel cartridge 120 reaches a third position P3a where it is fixed between the elastic force of the compression spring 132 and the elastic catches 132a. The process for releasing the liquid fuel cartridge 120 from the housing 110 is the reverse of the mounting process, and thus further description thereof is omitted.

Figure 7:
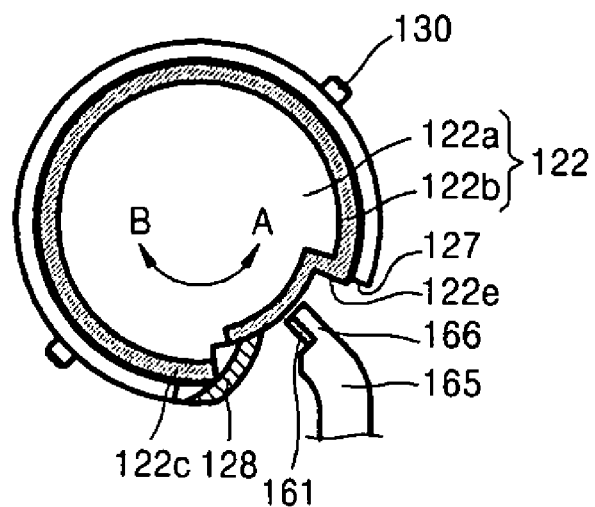
FIGS. 7 and 8 are cross-sectional views illustrating a process for supplying a liquid fuel from a liquid fuel cartridge according to an embodiment of the present invention.
Figure 8:
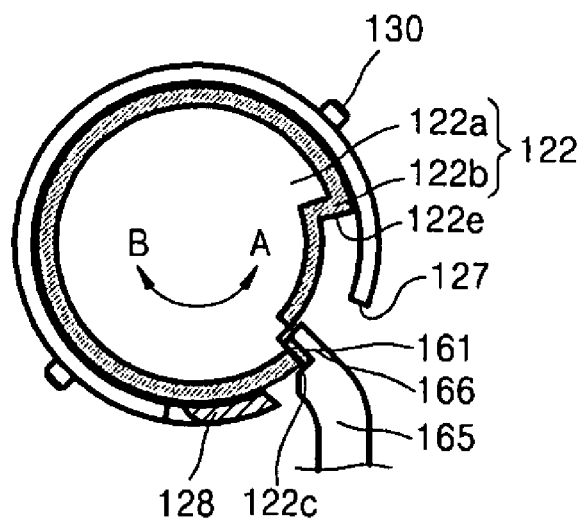

FIGS. 7 and 8 are cross-sectional views illustrating a process for supplying a liquid fuel from a liquid fuel cartridge according to an embodiment of the present invention. The cylindrical main body 122 of the liquid fuel cartridge 120 includes a porous member 122a that includes the liquid fuel, and a transport layer 122b that surrounds the porous material 122a and transports the liquid fuel to the transport sheet 160 by contacting the end part 161 of the transport sheet 160. The porous member 122a includes a plurality of pores like a sponge, to store the liquid fuel, and the transport layer 122b may be formed of a porous material having larger pores than the porous member 122a, to readily receive the liquid fuel from the porous material 122a and to convey it to the transport sheet 160.

Referring to FIG. 7, the cover plate 128 blocks an end part 122c of the transport layer 122b. Accordingly, the liquid fuel is not supplied to the transport sheet 160. When the handle 123 is turned in an arrow "A" direction, the cover plate 128 moves as depicted in FIG. 8 by the rotation of the cylindrical main body 122 while the external pocket 121 is fixed. Accordingly, the end part 122c of the transport layer 122b contacts the end part 161 of the transport sheet 160, and then the liquid fuel is supplied to the unit fuel cells. On the other hand, when the cylindrical main body 122 is turned in an arrow "B" direction, the fuel supply to the unit fuel cells is disconnected by separating the end part 122c of the transport layer 122b from the end part 161 of the transport sheet 160, and the cover plate 128 covers the end part 122c of the transport layer 122b by the restoration force of the cover plate spring 129.

FIGS. 9A through 9F are cross-sectional views of various types of cylindrical main bodies 122 of the liquid fuel cartridge 120 according to various embodiments of the present invention.

Figure 9A:
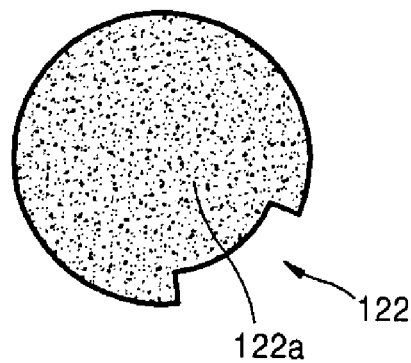
FIGS. 9A through 9F are cross-sectional views of various types of fuel cartridge bodies according to various embodiments of the present invention.

Referring to FIG. 9A, while not required in all aspects, the cylindrical main body 122 is formed of a porous member 122a, and accordingly, the portion that contacts the end part 161 of the transport sheet 160 is the porous member 122a.

Figure 9B:
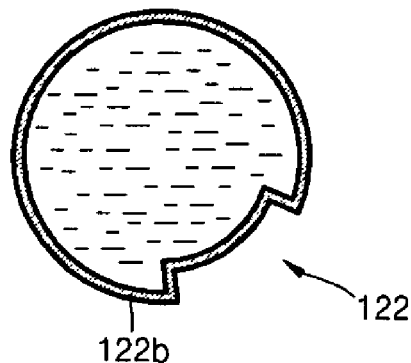

Referring to FIG. 9B, while not required in all aspects, the cylindrical main body 122 is formed of a thin transport layer 122b, and the liquid fuel fills the cylindrical main body 122. Accordingly, the portion that contacts the end part 161 of the transport sheet 160 is the transport layer 122b. The transport layer 122b may be formed of the material for forming the transport sheet 160, such as polymer paper. Even though it is not depicted, the end face of the cylindrical main body 122 is blocked by the transport layer 122b, to contain the liquid fuel in the transport layer 122b.

Figure 9C:
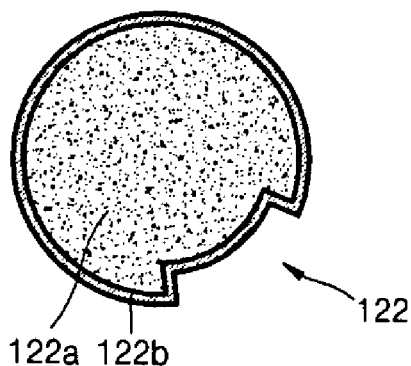

Referring to FIG. 9C, while not required in all aspects, the porous member 122a fills the cylindrical main body 122 to hold the liquid fuel within the transport layer 122b. The porous member 122a may have less porosity than the transport layer 122b.

Figure 9D:
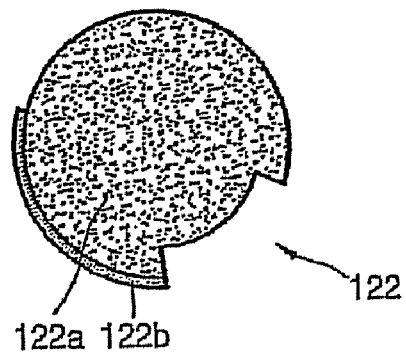

Referring to FIG. 9D, while not required in all aspects, the transport layer 122b is located on a portion of the outer circumference of the porous member 122a, particularly on a portion that contacts the end part 161 of the transport sheet 160.

Figure 9E:
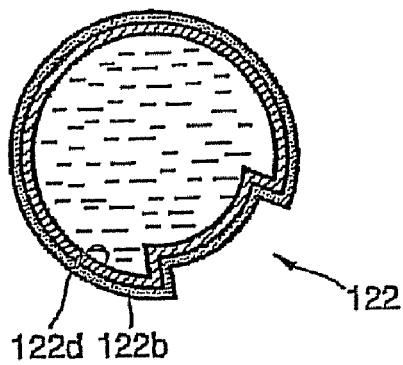

Referring to FIG. 9E, while not required in all aspects, an inner wall 122d is formed on the transport layer 122b to maintain the shape of the transport layer 122b. There are holes (not shown) in the inner wall 122d. Even though it is not depicted, the end face of the cylindrical main body 122 is blocked by the transport layer 122b, to contain the liquid fuel in the transport layer 122b.

Figure 9F:
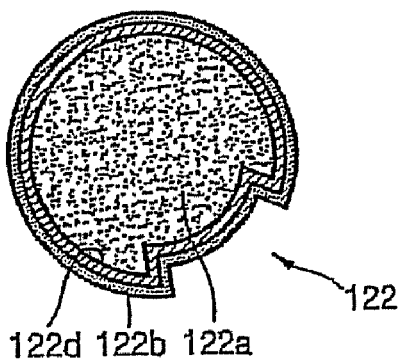

Referring to FIG. 9F, while not required in all aspects, the porous member 122a fills the cylindrical main body 122 to hold the liquid fuel within the inner wall 122d.

Figure 10:
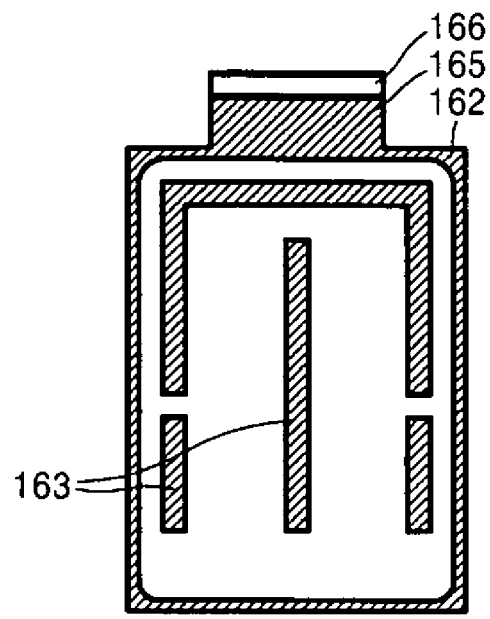
FIG. 10 is a bottom view illustrating the bottom surface of a transport plate according to an embodiment of the present invention.
Figure 11:
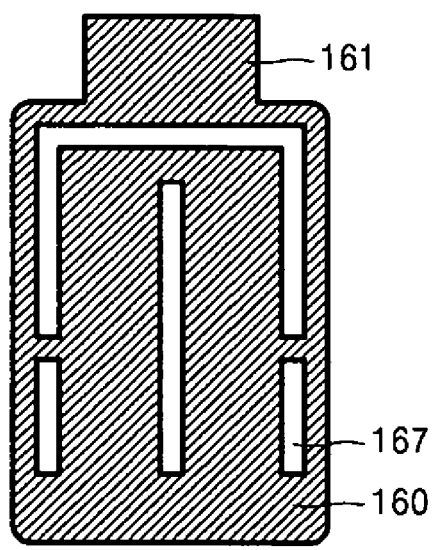
FIG. 11 is a plan view of a transport sheet according to an embodiment of the present invention.
Figure 12:
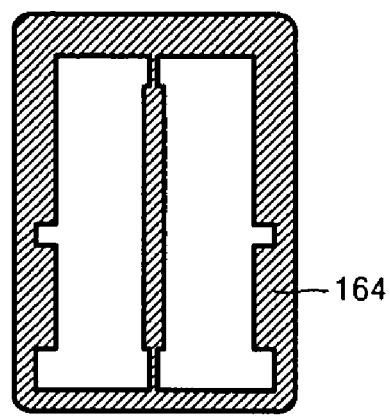
FIG. 12 is a plan view of a spacer plate according to an embodiment of the present invention.

FIG. 10 is a bottom view illustrating the bottom surface of a transport plate 162 according to an embodiment of the present invention, FIG. 11 is a plan view of a transport sheet 160 according to an embodiment of the present invention, and FIG. 12 is a plan view of a spacer plate 164 according to an embodiment of the present invention. While not required in all aspects, a protruding pattern 163 is formed on the transport plate 162. The slit 165 through which the end part 161 of the transport sheet 160 passes, and the guide unit 166 that supports the end part 161 that has passed through the slit 165, are formed on a side of the transport plate 162. A trench 167 corresponding to the protruding pattern 163 is formed on the transport sheet 160 which aligns the transport sheet 160 with the transport plate 162.

While not required in all aspects, the spacer plate 164 is open except for the portion corresponding to the trench 167 of the transport sheet 160 and edge portions. The spacer plate 164 can also be located in alignment with the transport plate 162. The pattern structure including the transport plate 162 distributes the liquid fuel, which enters through the end part 161 of the transport sheet 160 and passes to all regions except for the trench 167. Therefore, the liquid fuel can be uniformly distributed over the anode electrodes 146 of the unit fuel cells.

Figure 13:
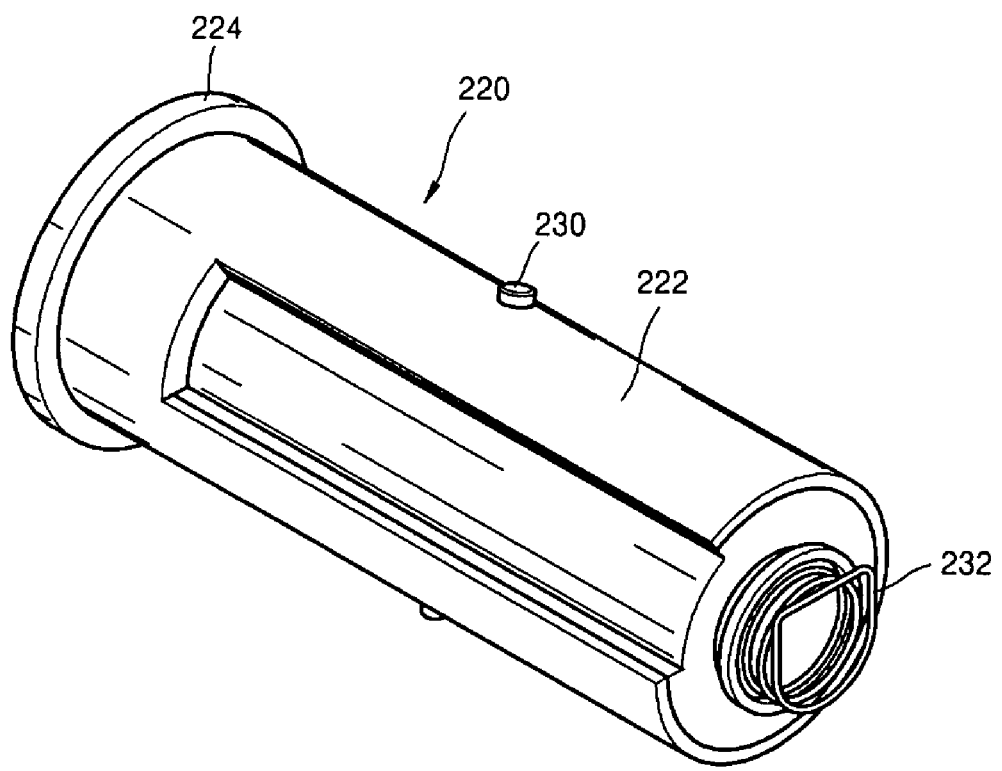
FIG. 13 is a perspective view illustrating a liquid fuel cartridge according to another embodiment of the present invention.

FIG. 13 is a perspective view illustrating a liquid fuel cartridge 220 according to another embodiment of the present invention. Reference numerals in FIG. 13 common to the above embodiment denote like elements, and thus further description of such common elements will be omitted.

Figure 14:
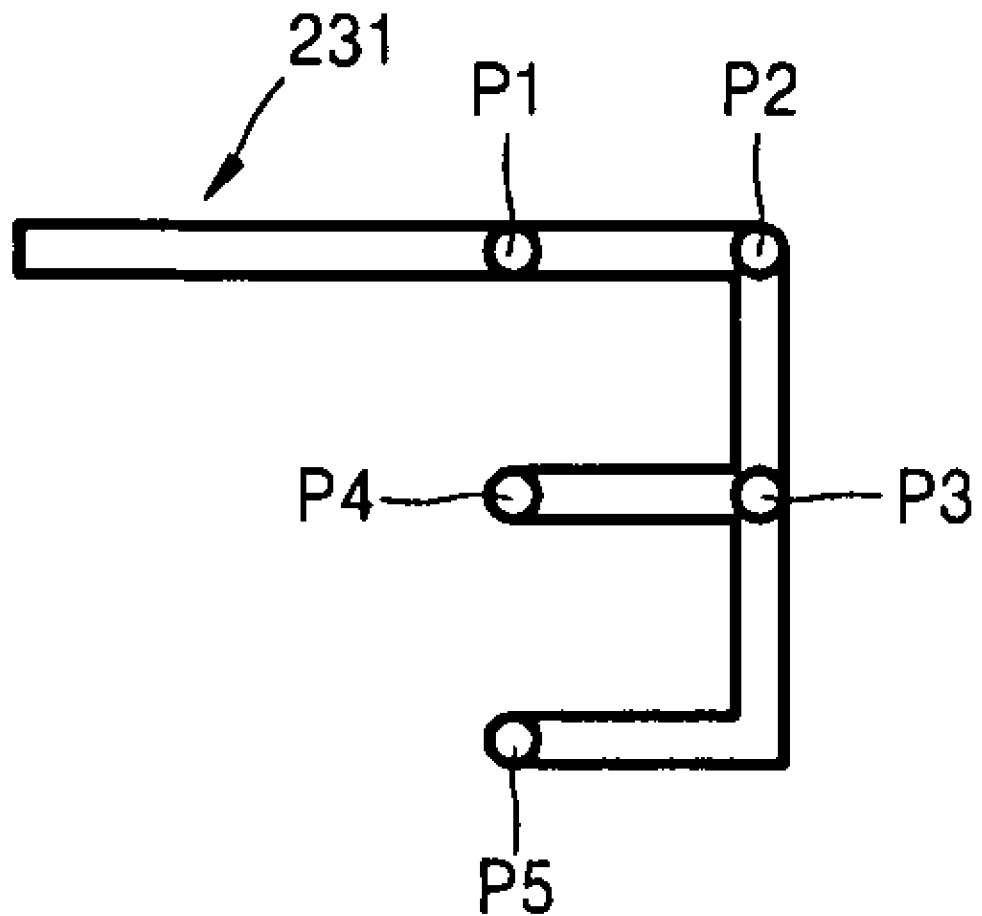
FIG. 14 is a schematic drawing of the shape of a guide groove according to an embodiment of the present invention.

A liquid fuel cartridge 220 according to the present embodiment includes a cylindrical main body 222 that stores a liquid fuel, and a cap 224 with a handle 123 (in FIG. 1) that is fixed to the cylindrical main body 122 and rotates the cylindrical main body 222 with respect to a cartridge inserting groove 114 of a housing 110. Protrusion parts 230 are formed on the outer circumference of the cylindrical main body 222, and guide grooves 231 are formed on the cartridge inserting groove 114 of the housing 110 to guide the protrusion parts 230 when the liquid fuel cartridge 220 is inserted into the housing 110. FIG. 14 is a schematic drawing of the shape of the guide groove 231. Reference numeral 232 denotes a compression spring attached to the bottom of the cartridge inserting groove 114 of the housing 110. The compression spring 232 provides an elastic force to push the liquid fuel cartridge 220 outward when the liquid fuel cartridge 220 is released from the cartridge inserting groove 114.

Figure 15:
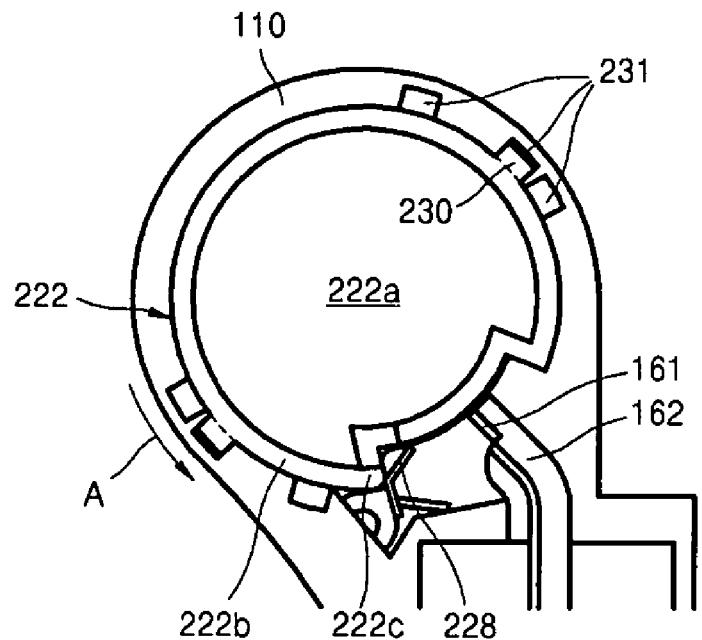
FIGS. 15 and 16 are cross-sectional views illustrating a process for supplying a liquid fuel from a liquid fuel cartridge according to another embodiment of the present invention.
Figure 16:
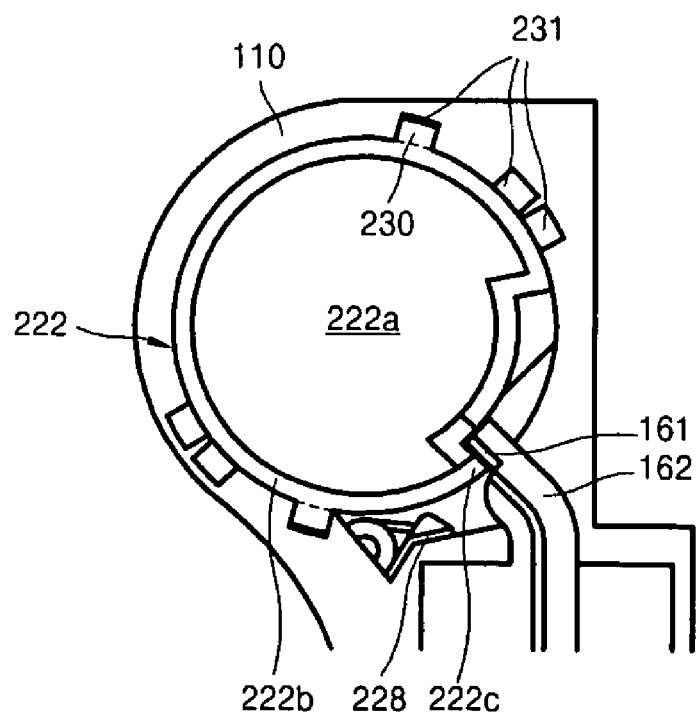

A process for mounting the liquid fuel cartridge 220 in the housing 110 will be described with reference to FIG. 14. The liquid fuel cartridge 220 is inserted into the cartridge inserting groove 114 while the protrusion parts 230 are aligned with the guide grooves 231. At this time, the protrusion parts 230 of the liquid fuel cartridge 220 reach a first position P1 where they are met by the elastic force of the compression spring 232. When the liquid fuel cartridge 220 is pushed further, the protrusion parts 230 reach a second position P2. When the handle 123 of the cap 224 is turned in an arrow "A" direction, the protrusion parts 230 reach a third position P3. Next, when the liquid fuel cartridge 220 is released, the liquid fuel cartridge 220 is pushed to a fourth position P4 and fixed. In the fourth position P4, the liquid fuel cartridge 220 is mounted in the housing 110. In this position, an end part 222c of a transport layer 222b mounted on the outer circumference of a porous member 222a is covered by a cover plate 228 (refer to FIG. 15). After the handle 123 is rotated in the arrow "A" direction while pushing and then released, the protrusion parts 230 locate in a fifth position P5, and at this time, the cover plate 228 is rotated outward by the rotation of the cylindrical main body 222. The end part 222c of the transport layer 222b contacts the end part 161 of the transport sheet 160 (refer to FIG. 16). Accordingly, the liquid fuel is supplied to the anode electrodes 146 of the unit fuel cells through the transport sheet 160. The process for disconnecting the liquid fuel supply to the anode electrodes 146 from the liquid fuel cartridge 220, and the process for detaching the liquid fuel cartridge 220 from the housing 110 is the reverse of the above-mentioned process, and thus further description thereof will be omitted.

As described above, the direct liquid feed fuel cell system includes a fuel cartridge that controls a fuel supply by rotation. According to aspects of the present invention, the direct liquid feed fuel cell system having the fuel cartridge provides the following advantages. A liquid fuel supply to a fuel cell can be readily controlled. Mobile communication equipment such as a mobile phone can be operated for an extended time when the fuel cartridge is attached to the mobile communication equipment. Communication equipment can be operated without the limitation of recharging a depleted battery power supply by replacing the fuel cartridge during the operation of the communication equipment.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A direct liquid feed fuel cell system comprising:
   a housing having a cartridge inserting groove and a first opening formed in a length direction of the cartridge inserting groove;
   a fuel cell located within the housing and including a plurality of cathode electrodes on an electrolyte membrane and a plurality of anode electrodes on the electrolyte membrane opposite to the cathode electrodes;
   a liquid fuel cartridge that contains a liquid fuel, inserted into the cartridge inserting groove to supply the liquid fuel to the anode electrodes; and
   a fuel transport unit to transport the liquid fuel to the anode electrodes, wherein the fuel transport unit is located between the liquid fuel cartridge and the anode electrodes, and the liquid fuel is supplied to the fuel transport unit when the liquid fuel cartridge is rotated in a first direction to a first position, and the supply of the liquid fuel is disconnected when the liquid fuel cartridge is rotated in a direction opposite to the first direction,
   wherein the fuel transport unit comprises,
      a transport sheet that extends from the fuel cell to the liquid fuel cartridge, to transport the liquid fuel, the transport sheet having an end part that passes through the first opening to selectively contact the liquid fuel cartridge, according to a rotation of the liquid fuel cartridge, and
      a transport plate that supports a first side of the transport sheet, comprising a slit through which the end part of the transport sheet passes.

2. The direct liquid feed fuel cell system of claim 1, wherein a planar surface of the housing covering the cathode electrodes comprises a plurality of holes for an air supply to the cathode electrodes.

3. The direct liquid feed fuel cell system of claim 1, wherein the transport plate comprises a guide unit that extends from the slit to support a first side of the end part of the transport sheet.

4. The direct liquid feed fuel cell system of claim 1, wherein the transport plate comprises a protrusion pattern on a region outside a region of the anode electrodes, and the protrusion pattern facilitates a uniform distribution of the liquid fuel supplied to the transport sheet from the liquid fuel cartridge.

5. The direct liquid feed fuel cell system of claim 4, wherein the transport sheet comprises a trench corresponding to the protrusion pattern.

6. The direct liquid feed fuel cell system of claim 5, wherein the fuel transport unit comprises a spacer plate having a predetermined height which covers a portion corresponding to the protrusion pattern of the transport plate, and the spacer plate is located on a second side of the transport sheet.

7. The direct liquid feed fuel cell system of claim 1, wherein the liquid fuel cartridge comprises a cylindrical main body that stores the liquid fuel, and the cylindrical main body comprises a long groove in the length direction of the cartridge inserting groove.

8. The direct liquid feed fuel cell system of claim 7, wherein the liquid fuel cartridge further comprises a transport layer that surrounds the cylindrical main body, and the transport layer has an end part that contacts the end part of the transport sheet by a rotation of the cylindrical main body.

9. The direct liquid feed fuel cell system of claim 7, wherein an empty space is formed in the cylindrical main body and the space is filled with the liquid fuel or a porous member to hold the liquid fuel.

10. The direct liquid feed fuel cell system of claim 7, wherein a supporting wall on which a plurality of holes are formed is installed in the cylindrical main body, and the liquid fuel or a porous member to hold the liquid fuel is filled inside the supporting wall.

11. The direct liquid feed fuel cell system of claim 1, wherein the liquid fuel cartridge comprises:
   a cylindrical main body that stores the liquid fuel, comprising a long groove in the length direction of the cartridge inserting groove;
   a pocket that is a hollow cylinder into which the cylindrical main body is inserted, the pocket having a second opening formed in the length direction of the liquid fuel cartridge, corresponding to an end part of the transport sheet;
   a cap fixed to an outside of the cylindrical main body, inserted into the pocket to cover the cartridge inserting groove; and
   a cover plate that covers a wall of the long groove, by being rotatably mounted on the pocket, and is opened by rotation of the cylindrical main body, so that the cylindrical main body can contact the end part of the transport.

12. The direct liquid feed fuel cell system of claim 11, further comprising:
   an elastic member installed at a bottom of the cartridge inserting groove to contact the pocket;
   a protrusion part on an outer circumference of the pocket; and
   a guide groove in the housing through which the protrusion part passes, and after the liquid fuel cartridge is inserted into the cartridge inserting groove and aligned so that the protrusion part passes along the guide groove, when the cap is released by rotating in the first direction while the elastic member is compressed by pushing the cap, the liquid fuel cartridge locates at a first position where the liquid fuel cartridge is mounted in the cartridge inserting groove.

13. The direct liquid feed fuel cell system of claim 12, wherein the guide groove comprises an elastic catch, and after the liquid fuel cartridge is inserted into the cartridge inserting groove and aligned so that the protrusion part passes along the guide groove, when the protrusion part is released by pressing toward the bottom of the cartridge inserting groove while the elastic catch and the elastic member are compressed by pushing the cap, the liquid fuel cartridge locates at a first position where the liquid fuel cartridge is mounted in the cartridge inserting groove.

14. The direct liquid feed fuel cell system of claim 1, wherein the liquid fuel cartridge comprises a cylindrical main body that stores the liquid fuel, comprising a long groove in the length direction of the cartridge inserting groove and a cap fixed to an outer end face of the cylindrical main body, the direct liquid feed fuel cell system further comprising a cover plate that covers a wall of the long groove by being rotatably mounted on the housing to open by rotation of the cylindrical main body so that the cylindrical main body contacts the end part of the transport sheet.

15. The direct liquid feed fuel cell system of claim 14, further comprising:
   an elastic member installed at a bottom of the cartridge inserting groove to contact the cylindrical main body;
   a protrusion part on an outer circumference of the cylindrical main body; and
   a guide groove in the housing through which the protrusion part passes, after the liquid fuel cartridge is inserted into the cartridge inserting groove and aligned so that the protrusion part passes along the guide groove, when the cap is released by rotating in the first direction while the elastic member is compressed by pushing the cap, while the protrusion part is moving along the guide groove, the liquid fuel cartridge locates at a first position where the liquid fuel cartridge is mounted in the cartridge inserting groove, and when the cap is released by further rotating in the first direction while the elastic member is compressed by pushing the cap, while the protrusion parts are moving along the guide groove, the liquid fuel cartridge locates at a second position where the liquid fuel cartridge supplies the liquid fuel to the fuel transport unit.

16. The direct liquid feed fuel cell system of claim 1, further comprising:
   an external terminal through which electrical energy generated by the fuel cell is supplied to the outside; and
   a printed circuit substrate comprising circuitry that connects the fuel cell to the external terminal.

17. The direct liquid feed fuel cell system of claim 16, wherein a mobile communication device is attachable to the external terminal to receive power from the direct liquid feed fuel cell.

18. A direct liquid feed fuel cell system comprising:
   a housing having a cartridge inserting groove;
   a liquid fuel cartridge disposed in the groove;
   a fuel cell in the housing to supply an electrical current external to the housing, the fuel cell having a cathode, an anode, and an electrolyte membrane between the cathode and the anode;
   a transport sheet disposed in the housing, to selectively transport the liquid fuel from the liquid fuel cartridge to the anodes, the transport sheet having an end that extends into the cartridge inserting groove, and
   a transport plate that supports a first side of the transport sheet, the transport plate comprising a slit through which the end of the transport sheet passes, wherein,
   when the fuel cartridge is rotated in a first direction to a first position, the end of the transport sheet contacts the liquid fuel cartridge, so as to transport the liquid fuel, and
   when the liquid fuel cartridge is rotated in an opposing second direction, the end of the transport sheet does not contact the liquid fuel cartridge, so as not to transport the liquid fuel.

19. The direct liquid feed fuel cell system of claim 18, a guide unit that extends from the slit, to support the end of the transport sheet.

* * * * *

UNITED STATES PATENT AND TRADEMARK OFFICE
CERTIFICATE OF CORRECTION

PATENT NO. : 7,771,889 B2  Page 1 of 1
APPLICATION NO. : 11/444468
DATED : August 10, 2010
INVENTOR(S) : Cho et al.

It is certified that error appears in the above-identified patent and that said Letters Patent is hereby corrected as shown below:

In the Claims

Column 10, Claim 19, line 62        After "claim 18," insert -- further comprising --

Signed and Sealed this
Twenty-second Day of November, 2011

David J. Kappos
*Director of the United States Patent and Trademark Office*